(12) United States Patent
Chen et al.

(10) Patent No.: US 7,771,698 B2
(45) Date of Patent: Aug. 10, 2010

(54) LASER-BASED METHOD FOR GROWING AN ARRAY OF CARBON NANOTUBES

(75) Inventors: Zhuo Chen, Beijing (CN); Yang Wei, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 461 days.

(21) Appl. No.: 11/982,517

(22) Filed: Nov. 2, 2007

(65) Prior Publication Data

US 2008/0152575 A1 Jun. 26, 2008

(30) Foreign Application Priority Data

Dec. 20, 2006 (CN) .................. 2006 1 0157696

(51) Int. Cl.
*D01F 9/12* (2006.01)
(52) U.S. Cl. ............... 423/447.3; 423/445 B; 977/742; 977/843
(58) Field of Classification Search ... 423/447.1–447.3, 423/445 B; 977/742, 843
See application file for complete search history.

(56) References Cited

U.S. PATENT DOCUMENTS

| 6,440,763 | B1 * | 8/2002 | Hsu ........................ 438/20 |
|---|---|---|---|
| 6,887,451 | B2 * | 5/2005 | Dodelet et al. ........... 423/447.3 |
| 6,917,058 | B2 * | 7/2005 | Niigaki et al. .............. 257/103 |
| 6,986,876 | B2 * | 1/2006 | Smalley et al. ........... 423/447.1 |
| 7,357,691 | B2 | 4/2008 | Liu et al. |
| 7,448,931 | B2 | 11/2008 | Liu et al. |
| 2003/0130114 | A1 * | 7/2003 | Hampden-Smith et al. .. 502/180 |
| 2004/0209385 | A1 | 10/2004 | Liu et al. |
| 2005/0000438 | A1 * | 1/2005 | Lim et al. .................. 118/722 |
| 2005/0052127 | A1 * | 3/2005 | Sakata et al. ................ 313/506 |
| 2006/0263524 | A1 | 11/2006 | Jiang et al. |

OTHER PUBLICATIONS

Kinghong Kwok, Wilson K.S. Chiu. "Growth of carbon nanotubes by open-air laser-induced chemical vapor deposition". Carbon, 2005, vol. 43, p. 437-446.

* cited by examiner

*Primary Examiner*—Stuart Hendrickson
*Assistant Examiner*—Richard M Rump
(74) *Attorney, Agent, or Firm*—Jeffrey T. Knapp

(57) ABSTRACT

A method for making/growing an array of carbon nanotubes includes the steps of: (a) providing a substrate; (b) forming a light absorption film made of a light absorption material on the substrate; (c) forming a catalyst film on the light absorption film; (d) introducing a mixture of a carrier gas and a carbon source gas by flowing the mixture over/across the catalyst film; (e) focusing a laser beam on the light absorption film to locally heat the catalyst to a predetermined/reaction temperature; and (f) growing an array of the carbon nanotubes from the substrate.

14 Claims, 2 Drawing Sheets

LASER-BASED METHOD FOR GROWING AN ARRAY OF CARBON NANOTUBES

RELATED APPLICATIONS

This application is related to commonly-assigned application: U.S. patent application Ser. No. 11/982,674, entitled, "LASER-BASED METHOD FOR MAKING FIELD EMISSION CATHODE", filed on Nov. 2, 2007; U.S. patent application Ser. No. 11/982,486, entitled "LASER-BASED METHOD FOR MAKING FIELD EMISSION CATHODE", filed on Nov. 2, 2007; U.S. patent application Ser. No. 11/982,485, entitled "LASER-BASED METHOD FOR GROWING AN ARRAY OF CARBON NANOTUBES", filed on Nov. 2, 2007; U.S. patent application Ser. No. 11/982,667, entitled "METHOD FOR MAKING AN ARRAY OF CARBON NANOTUBES", filed on Nov. 2, 2007; U.S. patent application Ser. No. 11/982,669, entitled "METHOD FOR MAKING AN ARRAY OF CARBON NANOTUBES", filed on Nov. 2, 2007; and U.S. patent application Ser. No. 11/982,489, entitled "METHOD FOR MAKING AN ARRAY OF CARBON NANOTUBES", filed on Nov. 2, 2007. Disclosures of the above-identified applications are incorporated herein by reference.

BACKGROUND

1. Field of the Invention

The invention relates generally to methods for making carbon nanotubes and, more particularly, to a method for making an array of carbon nanotubes.

2. Discussion of Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). CNTs are electrically conductive along their length, chemically stable, and each can have a very small diameter (much less than 100 nanometers) and large aspect ratios (length/diameter). Due to these and other properties, it has been suggested that CNTs can play an important role in fields such as microscopic electronics, field emission devices, thermal interface materials, etc.

Generally, there are three conventional methods for manufacturing CNTs. The first method is the arc discharge method, which was first discovered and reported in an article by Sumio Iijima entitled "Helical Microtubules of Graphitic Carbon" (Nature, Vol. 354, Nov. 7, 1991, pp. 56-58). The second method is the laser ablation method, which was reported in an article by T. W. Ebbesen et al. entitled "Large-scale Synthesis of Carbon Nanotubes" (Nature, Vol. 358, 1992, pp. 220). The third method is the chemical vapor deposition (CVD) method, which was reported in an article by W. Z. Li entitled "Large-scale Synthesis of Aligned Carbon Nanotubes" (Science, Vol. 274, 1996, pp. 1701). The CVD method is advantageously useful in synthesis of an array of carbon nanotubes and is advantageous in mass production, improved length controllability, compatibility with conventional integrated circuit process, etc.

Generally, mainly three CVD methods, i.e. the thermal CVD, plasma-enhanced CVD and laser-induced CVD, have been developed for the synthesis of arrays of carbon nanotubes. In conventional laser-induced CVD method, an opaque substrate such as silicon with catalyst is disposed in a closed reactor filled with reactant gases, and either argon ion laser or $CO_2$ laser are employed to directly irradiate laser light on the substrate to heat the substrate to reaction temperature. By locally laser-heating the substrate, carbon nanotubes can be synthesized on the substrate.

However, the above-described laser-assisted CVD method is performed at a closed reactor filled with reactant gases. Thus, the above-described method required a complicated reaction device, and it is difficult to build a huge reactor device for CVD growth of carbon nanotubes on large area substrate. Moreover, the newly grown carbon nanotubes will directly experience an intense laser field which will damage the newly grown carbon nanotubes. Thus, the morphology of the obtained carbon nanotubes will be damaged. These carbon nanotubes do not sufficiently exhibit the useful properties of an array of carbon nanotubes.

What is needed, therefore, is to provide a laser-induced chemical vapor deposition method for making an array of carbon nanotubes, in which the above problems are eliminated or at least alleviated.

SUMMARY

A method for making an array of carbon nanotubes includes the steps of: (a) providing a substrate; (b) forming a film of light absorption material (i.e., a light-absorption film) on the substrate; (c) forming a catalyst film on the light-absorbing film; (d) introducing a mixture of a carrier gas and a carbon source gas flowing through the catalyst film; (e) focusing a laser beam on the light-absorbing film to locally heat the catalyst to a predetermined temperature; and (f) growing an array of the carbon nanotubes from the substrate.

Other advantages and novel features of the present method for making an array of carbon nanotubes will become more apparent from the following detailed description of present embodiments when taken in conjunction with the accompanying drawings.

BRIEF DESCRIPTION OF THE DRAWINGS

Many aspects of the present method for making an array of carbon nanotubes can be better understood with reference to the following drawings. The components in the drawings are not necessarily to scale, the emphasis instead being placed upon clearly illustrating the principles of the present method for making an array of carbon nanotubes.

Figure 1:
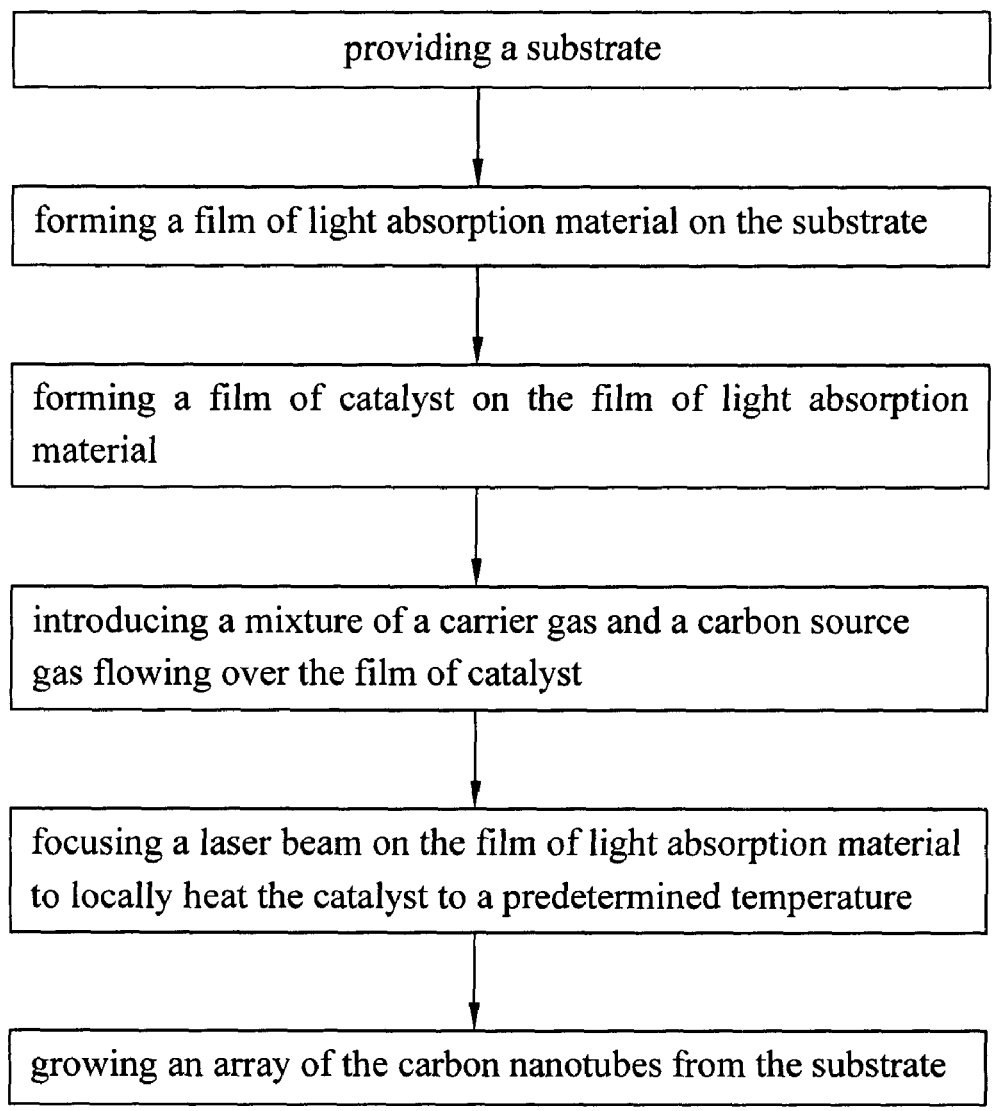
FIG. 1 is a flow chart of a method for making an array of carbon nanotubes in accordance with a present embodiment.

Corresponding reference characters indicate corresponding parts throughout the several views. The exemplifications set out herein illustrate at least one preferred embodiment of the present method for making an array of carbon nanotubes, in at least one form, and such exemplifications are not to be construed as limiting the scope of the invention in any manner.

DETAILED DESCRIPTION OF PREFERRED EMBODIMENTS

Reference will now be made to the drawings to describe embodiments of the present laser-based method for growing/forming an array of carbon nanotubes, in detail.

Referring to FIG. 1, a method for making an array of carbon nanotubes includes the steps of: (a) providing a substrate; (b) forming a film of light absorption material (i.e., a light absorption film) on the substrate; (c) forming a catalyst film on the light absorption film; (d) introducing a gas mixture of a carrier gas and a carbon source gas as a gas flow across/adjacent the catalyst film; (e) focusing a laser beam on the light absorption film to locally heat the catalyst to a predetermined temperature; and (f) growing an array of the carbon nanotubes from the substrate.

In step (a), the substrate is made of a heat-resistant material, which can tolerate a high reaction temperature. It is to be understood that depending on different applications, the material of the substrate could be selected, e.g., from a group consisting of silicon, silicon dioxide and metal for semiconductor electronical devices and/or glass for flat displays.

Step (b) includes the steps of: (b1) applying a carbonaceous material layer onto the substrate; (b2) gradually heating the substrate with the carbonaceous material layer to about 300~450° C. for a time within a range of about 60~90 minutes in an atmosphere of $N_2$ and/or another inert gas and baking the substrate with the carbonaceous material thereon for about 15~20 minutes; and (b3) cooling down the substrate with the carbonaceous material thereon to room temperature and thereby forming/yielding a light absorption layer on the substrate.

In step (b1), the carbonaceous material layer can be made of materials having merits of good electrical conductivity, strong adhesion with the substrate, and compatibility with high vacuum environment. Quite usefully, the carbonaceous material is a commercial colloidal graphite, as used for CRTs. The carbonaceous material can, beneficially, be spin-coated on the substrate at a rotational speed of about 1000~5000 rpm. Quite suitably, the rotational speed for spin coating is about 1500 rpm. In step (b2), the baking process is, at least in part, to eliminate any impurities in the carbonaceous material layer, such as the macromolecule material in the commercial graphic inner coating (GIC). The thickness of the formed light absorption layer is in the approximate range from 1 to 20 micrometers.

In step (c), the catalyst film can be uniformly disposed on the light absorption layer by means of chemical vapor deposition, thermal deposition, electron-beam deposition, or sputtering. The catalyst can, opportunely, be made of iron, gallium nitride, cobalt, nickel, or any combination alloy thereof. In one useful embodiment, a catalyst-ethanol solution is spin-coated (~1500 rpm) on the GIC layer to form the catalyst film. The catalyst-ethanol solution is a mixture solution of ethanol and one or more metallic nitrate compounds selected from a group consisting of magnesium nitrate ($Mg(NO_3)_2.6H_2O$), iron nitrate ($Fe(NO_3)_3.9H_2O$), cobalt nitrate ($Co(NO_3)_2.6H_2O$), nickel nitrate ($Ni(NO_3)_2.6H_2O$) and any combination thereof. Quite usefully, the catalyst-ethanol solution includes about 0.01~0.5 Mol/L magnesium nitrate and about 0.01~0.5 Mol/L iron nitrate. The thickness of the formed catalyst film is in the approximate range from 1 to 100 nanometers.

In step (d), a carbon source gas, which is combined with a carrier gas, is introduced as a gas flow across/adjacent the catalyst film. The carbon source gas acts as a primary source of carbon for growing the carbon nanotubes. In one useful embodiment, the carbon source gas and the carrier gas, in open air, are directly introduced by a nozzle to an area adjacent to the catalyst film. That is, the method can be operated without a closed reactor and/or without being under a vacuum. The carrier gas can be a nitrogen ($N_2$) gas or a noble gas. The carbon source gas can be ethylene ($C_2H_4$), methane ($CH_4$), acetylene ($C_2H_2$), ethane ($C_2H_6$), or any combination thereof. Quite suitably, the carrier gas is argon (Ar), and the carbon source gas is acetylene. A ratio of the carrier gas flow-rate to the carbon source gas flow-rate can be adjusted in the range from 5:1 to 10:1. Quite usefully, the argon flow-rate is 200 sccm (Standard Cubic Centimeter per Minute), and the acetylene flow-rate is 25 sccm.

In step (e), the laser beam can be generated by a laser beam generator (e.g., a carbon dioxide laser or an argon ion laser, etc.). A power of the laser beam generator is in the approximate range above about 0 W (Watt) (i.e., a measurable amount of power) to ~5 W. Quite usefully, a carbon dioxide laser of 470 mW is used for generating the laser beam. The laser beam generator further includes at least one lens for focusing laser beams generated by the laser beam generator. It is to be understood that the focused laser beam could be employed to directly irradiate the catalyst film to heat the catalyst to a predetermined temperature along a direction vertical/orthogonal or oblique to the substrate (i.e., the surface of the substrate upon which the array is grown). That is, the method can be operated in open air without heating the entire substrate to meet a reaction temperature for synthesizing carbon nanotubes.

In step (f), due to catalyzing by the catalyst film, the carbon source gas supplied through the catalyst film is pyrolyzed in a gas phase into carbon units (C=C or C) and free hydrogen ($H_2$). The carbon units are absorbed on a free surface of film of the catalyst and diffused into the film of the catalyst. When the film of the catalyst is supersaturated with the dissolved carbon units, carbon nanotube growth is initiated. As the intrusion of the carbon units into the film of the catalyst continues, an array of carbon nanotubes is formed. The additional hydrogen produced by the pyrolyzed reaction can help reduce the catalyst oxide and activate the catalyst. As such, the growth speed of the carbon nanotubes is increased, and the height of the array of the carbon nanotubes is enhanced.

It is noted that the catalyst film can be heated by laser irradiating. At the same time, the light absorption layer can absorb laser energy and further promote heating the catalyst film. Thus, the predetermined temperature for locally heating the catalyst film by laser beam can be less than 600° C. Moreover, the present method can heat the catalyst film to a predetermined reaction temperature within less time. Further, the carbon source gases are directly introduced to area near the catalyst film. As such, the predetermined reaction temperature and the concentration of the carbon source gases can achieve the requirements for CNTs growth in open air, without a closed reactor under a vacuum.

Figure 2:
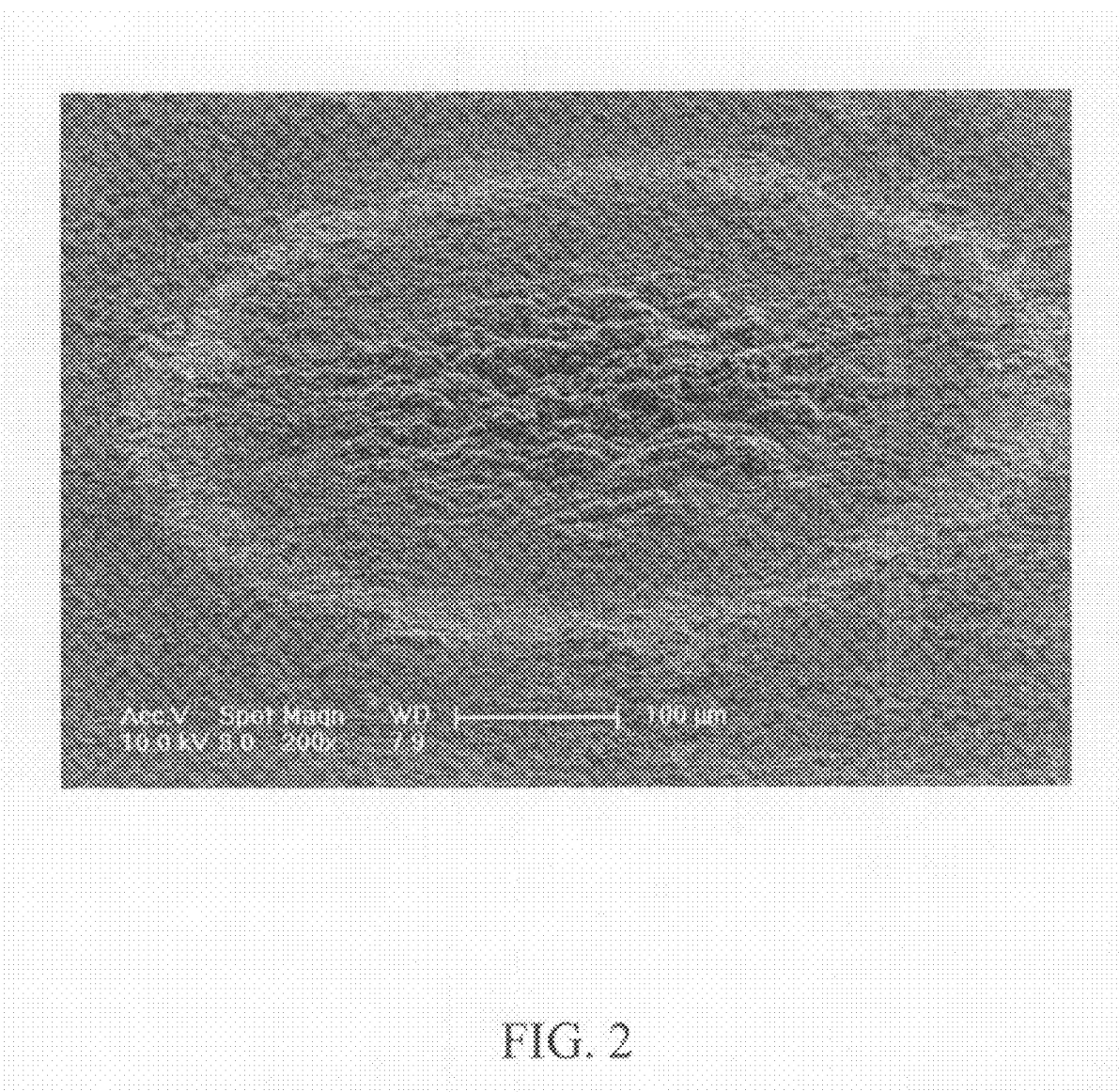
FIG. 2 shows a Scanning Electron Microscope (SEM) image of the array of carbon nanotubes formed by the method of FIG. 1.

Referring to FIG. 2, an array of carbon nanotubes manufactured by the present method is shown. The array of carbon nanotubes is synthesized by irradiating the focused laser beam on the catalyst film for about 30 seconds. A diameter of the focused laser beam is in the approximate range from 50 to 200 micrometers. The formed array of carbon nanotube manifests a hill-shaped morphology. The diameter of the hill is in the approximate range from 100 to 200 micrometers. The maximum height of the hill is in the approximate range from 10 to 20 micrometers. The diameter of each of carbon nanotubes is in the approximate range from 10 to 30 nanometers.

It is noted that, the present method can synthesize a large area array of carbon nanotubes by scanning the laser beam on a large area substrate and that the property of carbon nanotubes thus produced is essentially uniform.

Compared with conventional CVD methods for making carbon nanotube arrays, the methods in the described embodiments employ a light absorption film thereby having the following virtues. Firstly, the light absorption material will absorb laser light and heat up the catalyst to enable the carbon nanotubes growth. Secondly, the light absorption material will attenuate the laser field and avoid damaging the newly grown carbon nanotubes by an intense laser. Lastly, the light absorption material will release carbon atoms to promote the nucleation of carbon nanotubes, when irradiated by the laser beam. As such, the present method can be used at a relatively low temperature, for example, less than 600° C. Moreover, the present method for growing arrays of carbon nanotubes can proceed in open air, without a closed reactor under a vacuum. Furthermore, the present method can synthesize large area arrays of carbon nanotubes by scanning the laser beam on the catalyst. That is, the operation and cost of the present method is relatively simple and low compared to conventional methods.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A method for growing an array of carbon nanotubes, comprising the steps of:
   (a) providing a substrate;
   (b) forming a light absorption film on the substrate, the light absorption film being comprised carbonaceous of a light absorption material;
   (c) forming a catalyst film on the light absorption film;
   (d) flowing a mixture of a carrier gas and a carbon source gas across the catalyst film;
   (e) focusing a laser beam on the light absorption film to locally heat the catalyst to a predetermined temperature; and
   (f) growing the array of the carbon nanotubes from the substrate.

2. The method as claimed in claim 1, wherein step (b) further comprises the steps of:
   (b1) gradually heating the carbonaceous material to about 300° C. within about 90 minutes in $N_2$ atmosphere;
   (b2) baking the carbonaceous material; and
   (b3) cooling down the carbonaceous material to room temperature and forming the light adsorption film on the substrate.

3. The method as claimed in claim 2, wherein the carbonaceous material comprises colloidal graphite.

4. The method as claimed in claim 3, wherein the colloidal graphite layer is formed on the substrate by spin coating.

5. The method as claimed in claim 1, wherein a thickness of the light absorption film is in the approximate range from 1 to 20 micrometers.

6. The method as claimed in claim 1, wherein step (c) further comprises the steps of:
   (c1) providing a catalyst solution;
   (c2) coating the catalyst solution on the light absorption film; and
   (c3) baking the catalyst solution to form a catalyst film.

7. The method as claimed in claim 6, wherein the catalyst solution is a mixture of ethanol and at least one metallic nitrate compound selected from a group consisting of magnesium nitrate, iron nitrate, cobalt nitrate, nickel nitrate, and any combination thereof.

8. The method as claimed in claim 1, wherein a thickness of the catalyst film is in the approximate range from 1 to 100 nanometers.

9. The method as claimed in claim 1, wherein the carbon source gas is selected from a group consisting of ethylene, methane, acetylene, and ethane.

10. The method as claimed in claim 1, wherein the carrier gas is comprised of at least one of nitrogen gas and noble gas.

11. The method as claimed in claim 1, wherein a ratio of the carrier gas flow-rate to the carbon source gas flow-rate is in the approximate range from 5:1 to 10:1.

12. The method as claimed in claim 1, wherein in step (d), the laser beam is generated by either a carbon dioxide laser or an argon ion laser.

13. The method as claimed in claim 12, wherein the laser generator further comprises at least one lens for focusing the laser beam.

14. The method as claimed in claim 13, wherein a diameter of focused laser is in the approximate range from 50 to 200 micrometers.

* * * * *